UNITED STATES PATENT OFFICE.

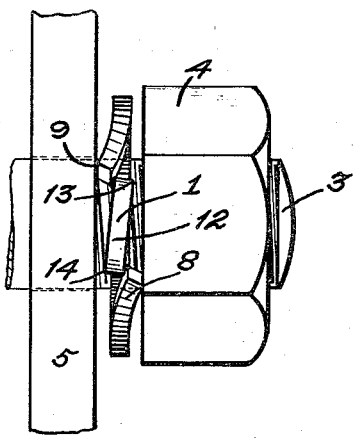
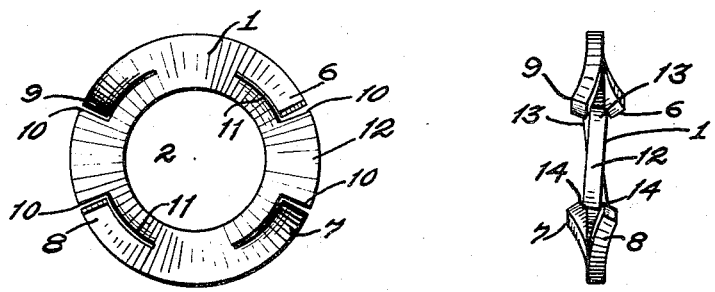

ALFRED J. RICH, JR., OF SAN FRANCISCO, CALIFORNIA.

LOCK-WASHER.

1,267,695. Specification of Letters Patent. Patented May 28, 1918.

Application filed February 19, 1917, Serial No. 149,385. Renewed December 17, 1917. Serial No. 207,621.

*To all whom it may concern:*

Be it known that I, ALFRED J. RICH, Jr., a citizen of the United States, residing at the city and county of San Francisco and State of California, have invented certain new and useful Improvements in Lock-Washers, of which the following is a specification.

The present invention relates to improvements in lock washers and has for its principal objects to provide a simple, inexpensive and efficient washer designed for use in connection with bolts subjected to vibration and which is capable of securely locking a nut from accidental rotation thereon, whereby the nut is virtually prevented from being unscrewed by the vibration to which the bolt or nut is subjected. Further objects of the invention are to provide a washer capable of being made of either light or heavy material and to adapt it for the character of work to which it is to be applied and one which is capable of use with a nut having a smooth surface or one provided at intervals with shoulders to interlock with it.

The invention consists in the construction and novel combination and arrangement of parts hereinafter described, illustrated in the accompanying drawings and pointed out in the claims hereto appended.

In the drawings,

Figure 1 is a view in side elevation of a lock washer constructed in accordance with this invention.

Fig. 2 is a view in elevation of the improved washer.

Fig. 3 is a side view of the washer illustrated in Fig. 2.

Referring more particularly to the several views of the drawings wherein like characters of reference designate corresponding parts, 1, indicates my improved washer formed preferably of spring sheet steel circular in form and provided with a central opening 2 adapted to be arranged on a bolt 3 between a nut 4 and a suitable member or plate 5 and capable of engaging and locking the same from unscrewing or rotating due to the jar or vibration to which the belt or plate may be subjected.

The washer is provided on its peripheral edge with the tongue or fingers 6, 7, 8 and 9, which are formed by stamping, pressing or shearing the radial cuts 10 in the peripheral surface of the metal and extending at right angles from the inner ends of said cuts 10 the arcuate cuts 11. The tongues are arranged in pairs at opposite sides of the washer with their free ends separated by the solid portion 12 and bent in opposite directions from the opposite sides of the washer. The solid portions 12 are slightly bent or twisted in the stamping of the fingers in a direction approximately parallel with the angle of the bend of said fingers as in Fig. 3 whereby a greater biting action is permitted of the fingers when engaged between the surfaces, said twisting also provides additional surfaces or edges 13 and 14 disposed in opposite directions for assisting the tongues in restraining the nut from accidental rotation on the bolt. The fingers 6 and 8 and edges 13 and 14 of opposite faces of solid portions 12 and the fingers 7 and 9 and the other edges 13 and 14 of the solid portions 12 respectively, engage opposite surfaces when a nut is screwed down on to them and the greater the pressure the flatter the tongues are depressed until their outer surfaces lie in a plane with the opposite edge of the solid portion 12, at which time the limiting action of said surfaces or edges 13 or 14 assists that of the tongues, thus, it will be apparent that when the nut is screwed down tight the tongues as well as the edges 13 and 14 prevent the jarring loose of the same.

It is apparent, that my improved washer may be manufactured at a single stamping, will lock a nut from accidental unscrewing and at the same time will permit the nut to be removed by a wrench or tool when the necessary power is applied thereto.

Having thus described my invention, what I claim is:

1. A lock washer provided on its outer peripheral edge with a plurality of fingers arranged in pairs at opposite sides thereof, the fingers of each pair extending in a direction toward each other with the free ends thereof separated by a solid portion of the washer body and bent to point in opposite directions from opposite sides of the washer body.

2. A lock washer provided on its outer peripheral edge with a plurality of fingers arranged in pairs at opposite sides thereof, the fingers of each pair extending in a direction toward each other with the free ends thereof separated by a solid portion of the washer body and bent to point in opposite directions from opposite sides of the washer body, and the solid portion of the washer body separating the free bent ends of said fingers, being bent or twisted to lie in a plane approximately parallel with the angle of the bend of the pair of fingers adjacent thereto.

In testimony whereof I have signed my name to this specification in the presence of two subscribing witnesses.

ALFRED J. RICH, Jr.

Witnesses:
 HARRY A. TOTTEN,
 D. B. RICHARDS.